United States Patent
Liang (10) Patent No.: US 7,145,934 B2
(45) Date of Patent: Dec. 5, 2006

(54) MULTICHANNEL SIGNAL TRANSMISSION AND RECEPTION FOR BLUETOOTH SYSTEMS

(76) Inventor: Ping Liang, 18 Vienne, Irvine, CA (US) 92606

( * ) Notice: Subject to any disclaimer, the term of this patent is extended or adjusted under 35 U.S.C. 154(b) by 974 days.

(21) Appl. No.: 09/798,482

(22) Filed: Mar. 3, 2001

(65) Prior Publication Data

US 2002/0150147 A1 Oct. 17, 2002

(51) Int. Cl.
*H04B 1/713* (2006.01)

(52) U.S. Cl. .................................. 375/133; 375/135

(58) Field of Classification Search ............... 375/132, 375/133, 135, 136, 141, 146, 147, 148, 295, 375/299, 316, 347; 455/452.1, 452.2, 101, 455/103, 561; 370/329, 332, 334, 338, 341
See application file for complete search history.

(56) References Cited

U.S. PATENT DOCUMENTS

| | | | | |
|---|---|---|---|---|
| 5,323,391 A | * | 6/1994 | Harrison | 370/210 |
| 5,546,429 A | * | 8/1996 | Chiasson et al. | 375/341 |
| 5,719,857 A | * | 2/1998 | Heikkinen | 370/330 |
| 6,006,075 A | * | 12/1999 | Smith et al. | 455/101 |
| 6,028,853 A | * | 2/2000 | Haartsen | 370/338 |
| 6,298,092 B1 | * | 10/2001 | Heath et al. | 375/267 |
| 6,400,751 B1 | * | 6/2002 | Rodgers | 375/132 |
| 6,519,460 B1 | * | 2/2003 | Haartsen | 455/452.1 |
| 6,636,495 B1 | * | 10/2003 | Tangemann | 370/334 |
| 6,665,549 B1 | * | 12/2003 | Reed | 455/573 |
| 6,690,657 B1 | * | 2/2004 | Lau et al. | 370/315 |
| 6,728,294 B1 | * | 4/2004 | Kohno et al. | 375/133 |
| 6,829,288 B1 | * | 12/2004 | Orava | 375/132 |

OTHER PUBLICATIONS

Alfredo Linz et al., *Efficient Implementation of an I-Q GMSK Modulator*, IEEE Transactions on Circuits and Systems—II: Analog and Digital Signal Processing, vol. 43, No. 1.

* cited by examiner

*Primary Examiner*—Khanh Tran
(74) *Attorney, Agent, or Firm*—Blakely, Sokoloff, Taylor & Zafman, LLP (57) ABSTRACT

One embodiment of the present invention includes a circuit and a transmitter. The circuit generates a first signal at a first frequency and a second signal at a second frequency. The first frequency is provided by a first frequency-hopping sequence such that the first and second frequencies are non-colliding. The transmitter transmits the first and second signals in a radio frequency (RF) band simultaneously within a transmission period. Another embodiment of the invention includes a receiver and a circuit. The receiver receives simultaneously a first signal at a first frequency and a second signal at a second frequency in a radio frequency (RF) band. The first frequency is provided by a first frequency-hopping sequence such that the first and second frequencies are non-colliding. The circuit demodulates the first and second signals into first and second data streams, respectively.

14 Claims, 9 Drawing Sheets

MULTICHANNEL SIGNAL TRANSMISSION AND RECEPTION FOR BLUETOOTH SYSTEMS

BACKGROUND

1. Field of the Invention

This invention relates to communication systems. In particular, the invention relates to Bluetooth technology.

2. Description of Related Art

In the past decade, mobile computing and communication devices have become increasingly popular. The Bluetooth wireless technology is making the use of mobile devices more efficient and convenient. With Bluetooth technology, interconnection of mobile devices and computers can be easily done. Users can now create a personal network around their mobile computer for enhanced productivity. Such personal networks may include mobile phones, personal data assistants (PDAs) and other portable devices without cables, connecting wires, or adapters. A user can check e-mail and access the Internet on his or her mobile computer via his or her mobile phone, share information with others in a virtual meeting or conference over the Internet, or local area networks (LANs), synchronize data, calendars, scheduling information between the PDA and the computer, configure the security system installed at his or her home, etc.

One of the reasons for this popularity of the Bluetooth technology is the existence of well adopted industry standard and specifications and worldwide availability of the Industrial Scientific Medicine (ISM) spectrum. The Bluetooth standards allow portability, interchangeability, and flexibility among equipment or devices made by different manufacturers. However, the existing standard limits the transmission of data to 1 Mbps data rate. Emerging Bluetooth 2.0 specification explores the possibility of extending the data rate to 10 Mbps or higher. The current Bluetooth systems, including the Bluetooth 2.0 specification, cannot transmit multiple signals simultaneously. To accommodate more signals, existing Bluetooth systems have to be modified.

Therefore, there is a need to have an efficient technique to process simultaneous multi-channel signals without incurring significant changes in the existing systems.

BRIEF DESCRIPTION OF THE DRAWINGS

The features and advantages of the present invention will become apparent from the following detailed description of the present invention in which.

DESCRIPTION

One embodiment of the invention achieves N, e.g., N=2, times the standard data rate of a frequency hopping spread spectrum radio standard such that it is compatible with the standard. Such a system may communicate with a single conventional radio frequency (RF) module and comply with the standard at one times the standard data rate. The system may also communicate with N conventional RF modules compliant with the standard simultaneously and at one times the standard data rate with each of the N modules. When two RF modules of this invention are used together, they can communicate at N times the standard data rate.

Another embodiment of the invention provides radio links to different kinds of standards controlled by the same module or circuit. The embodiment avoids collision and reduces interference between the radios by co-ordinating their spectrum use.

One embodiment of the present invention includes a circuit or a modulator and a transmitter. The modulator generates a first signal at a first frequency and a second signal at a second frequency. The first frequency is provided by a first frequency-hopping sequence such that the first and second frequencies are non-colliding. The transmitter transmits the first and second signals in a radio frequency (RF) band simultaneously within a transmission period. Another embodiment of the invention includes a receiver and a demodulator or a circuit. The receiver receives simultaneously a first signal at a first frequency and a second signal at a second frequency in a radio frequency (RF) band. The first frequency is provided by a first frequency-hopping sequence such that the first and second frequencies are non-colliding. The demodulator demodulates the first and second signals into first and second data streams, respectively.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. In addition, although this invention is described in the context of Bluetooth technology, the principle of this invention can be applied to other wireless or communication systems.

Figure 1:
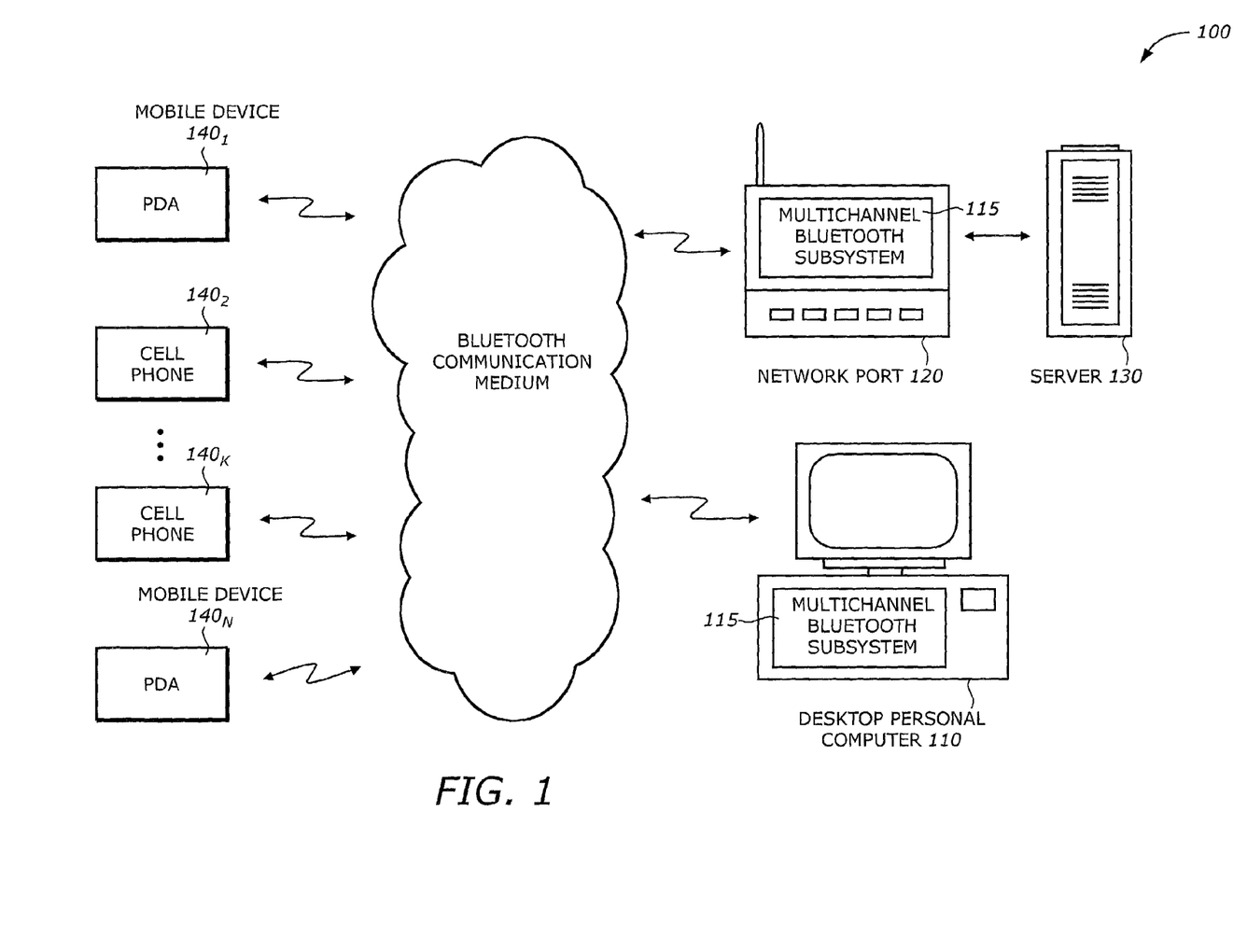
FIG. 1 is a diagram illustrating a system in which one embodiment of the invention can be practiced.

FIG. 1 is a diagram illustrating a system 100 in which one embodiment of the invention can be practiced. The system 100 includes personal computers (PC) 110 and 112, a network access point or gateway 120, a network interface controller 130, and N mobile devices $140_1$ to $140_N$.

The computers 110 and 112 represent any computer system or computer-based processing system. Examples of the computers 110 and 112 may include workstations, desktop computer systems, notebook computers, and centralized controllers for business or residential units. The computers 110 and 112 include a multi-channel wireless subsystem 115. In one embodiment, the multiple channels in the subsystem 115 is a subsystem that can receive or transmit simultaneously multiple Bluetooth compatible signals having non-colliding frequencies. Non-colliding frequencies are frequencies that are not overlapped or coincident. In another embodiment, the multiple channels in the subsystem 115 is a subsystem that can receive or transmit simultaneously at least one Bluetooth compatible signals and at least one Institute of Electrical and Electronics Engineers ("IEEE") 802.11 wireless local area network (WLAN) compatible signals where the spectrum use of the multiple channels are co-ordinated to avoid or minimize collision.

The network access point or gateway 120 is a remote communication port to receive and transmit wireless connections from mobile devices $140_1$ to $140_N$ using a multi-channel Blutetooth subsystem 115. Examples of network access point or gateway 120 include remote ports installed at airport terminals, hotels, shopping malls and convention centers. Users having Bluetooth or WLAN compatible mobile devices can be automatically connected to the network using wireless connections with the network access point or gateway 120. The network access point or gateway 120 is connected to a network interface controller 130 to allow network connections between the mobile devices $140_1$ to $140_N$ and corresponding networks.

The mobile devices $140_1$ to $140_N$ transmit and receive RF signals via the Bluetooth communication medium within the allowable ranges. Examples of the mobile devices $140_1$ to $140_N$ include personal digital assistants (PDA's), cell phones, and any other wireless mobile devices. In one embodiment, multiple mobile devices may communicate with one or more multi-channel Bluetooth subsystem 115.

The multi-channel wireless subsystem 115 includes radio units that transmit and receive RF signals. The radio units may transmit, receive, or transmit and receive simultaneously multiple RF signals having non-colliding frequencies. The multiple RF signals may be frequency hopping signals, or a combination of frequency hopping signals and fixed frequency signals such as direct sequence spread spectrum signals. If the number of Bluetooth equipped mobile devices is the same as the number of Bluetooth channels in the multi-channel wireless subsystem 115, the multiple Bluetooth channels in the multi-channel wireless subsystem 115 can communicate with each of the N mobile devices $140_1$ to $140_N$ at the standard Bluetooth data rate. When the multi-channel wireless subsystem 115 communicates with N mobile devices $140_1$ to $140_N$ each at the standard Bluetooth data rate, the overall system has the effective data rate of N times the Bluetooth standard data rate. The collision avoidance of the signals is performed by co-ordination of the spectrum usage of the radio units.

Each Bluetooth channel in the multi-channel wireless subsystem 115 can also communicate with a subset m of the N mobile devices if the number of mobile device N is more than the number of Bluetooth channels in the multi-channel wireless subsystem 115. In this case, each mobile device communicates with one Bluetooth channel in the multi-channel wireless subsystem 115 at 1/m of the standard Bluetooth data throughput.

When two mobile devices or computers equipped with multi-channel wireless subsystem 115 communicates with each other, they can communicate at a higher data rate than a single channel. For example, the computers 110 and 112 can communicate at N times the Bluetooth standard data rate if both of them are equipped with N Bluetooth channels.

The invention may provide several embodiments as shown in FIGS. 2A through 2D. Each embodiment has different topology and component interconnections. The components may be implemented in the same circuit or in separate circuits. In one embodiment of this invention, the non-collision of multiple RF signals is provided by co-ordination of the signals, rather than by a priori design of the signals to be non-colliding. The frequency co-ordination may be performed at the link manager or at the link controller or at the radio level as appropriate. To illustrate the processing of non-colliding signals, two RF signals may be used. There may be several scenarios for the non-colliding signals. In a first scenario, one signal may be at a fixed frequency range such as direct sequence spread spectrum while the other is frequency-hopping. The hopping sequence is chosen either a priori or at runtime such that the resulting hopping frequencies are not coincident or overlapped with the fixed frequency range when the fixed frequency signal is transmitting, or skips the fixed frequency range in its frequency hopping sequence. In a second scenario, the fixed frequency signal may be disabled temporarily in real-time to avoid collision with a hopping signal. The first and second scenarios may be used interchangeably in the same system depending on the priority of data in each of the channels. In another scenario, both signals are frequency-hopping but the hopping sequences are such that the resulting frequencies are not coincident or overlapped at any time. In yet another scenario, both signals are frequency-hopping where the hopping sequence of one signal is a function of the hopping sequence of the other signal such that they do not collide. In yet another scenario, both signals are frequency-hopping but the two signals are separated by a fixed frequency interval. In the simplest implementation, the two signals may have the same hopping sequence, but one signal is then frequency translated into another frequency such that the two signals are always non-colliding.

Figure 2A:
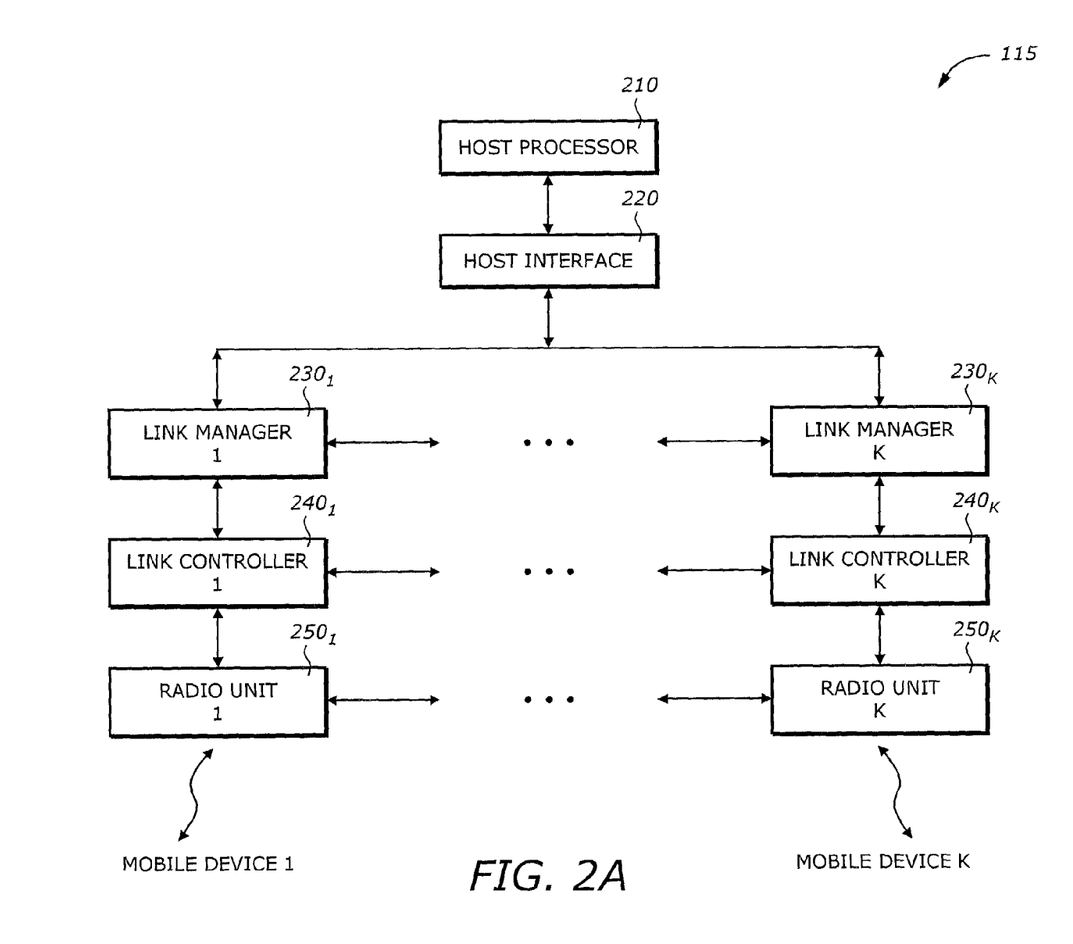
FIG. 2A is a diagram illustrating a multi-channel Bluetooth subsystem with multiple link managers, multiple link controllers, and multiple radio units according to one embodiment of the invention.

FIG. 2A is a diagram illustrating a multi-channel wireless subsystem 115 with multiple link managers, multiple link controllers, and multiple radio units according to one embodiment of the invention. The subsystem 115 includes a host processor 210, a host interface 220, K link managers $230_1$ to $230_K$, K link controllers $240_1$ to $240_K$, and K radio units $250_1$ to $250_K$.

The host processor 210 represents any processor, microprocessor, microcomputer that acts as the central processing unit of the subsystem. The host processor 210 may be the system processor of the computer system 110 (FIG. 1), a central controller, or the network interface controller 130 (FIG. 1). The host interface 220 provides interface between the link managers and the host processor 210. The host interface 220 may include a bus interface, a serial communication interface, a switching interface, or any hardware or software interface that allows the link managers to communicate with the host processor 210.

Each of the K link managers $230_1$ to $230_K$ is coupled to a corresponding one of the K link controllers $240_1$ to $240_K$. Each of the K link controllers $240_1$ to $240_K$ is in turn coupled to a corresponding one of the K radio units $250_1$ to $250_K$. Each of the K radio units $250_1$ to $250_K$ communicates with the mobile devices. In the following discussion, the subscript may be dropped for brevity. The link manager 230 manages wireless connections between at least one of the mobile devices and a host processor 210. The link managers $230_1$ to $230_K$ may co-ordinate among themselves the spectrum usage of the corresponding radio units such that the RF signals to be transmitted or received do not occupy at the same frequency at any time (i.e., the RF signals are non-colliding). The link controller 240 controls the wireless connections such as passing the data streams representing the RF signals between the radio units and the host processor 210. In addition, the link controllers $240_1$ to $240_K$ may co-ordinate among themselves the frequency usage of the radio units. In another embodiment, the spectrum usage co-ordination may occur directly at the radio level. The radio unit 250 processes radio frequency (RF) signals for the wireless connections. The radio unit 250 may include a transmitter, a receiver, or both the transmitter and receiver. For transmission, the radio unit 250 converts the data stream as provided by the corresponding link controller into baseband analog signals and then to RF signals. For reception, the radio unit converts the RF signals into the baseband analog signals and then to the data stream to be sent to the corresponding link controller. The radio unit 250 may transmit or receive multiple RF signals having non-colliding frequencies.

The configuration of the radio units is flexible to accommodate many scenarios. In one embodiment, the radio unit $250_j$ may include a first transmitting circuit to generate a first signal at a first frequency which is received by a second receiving circuit. The radio unit $250_j$ or another radio unit $250_k$ may include a first receiving circuit to receive a second signal at a second frequency which is transmitted by a second transmitting circuit. The first and second frequencies are non-colliding. In addition, the multiple transmitters and/or receivers may be integrated or combined into a single unit or circuit. Similarly, the modulators and/or demodulators in the transmitting and/or receiving circuits may also be integrated or combined into a single unit or circuit.

Figure 2B:
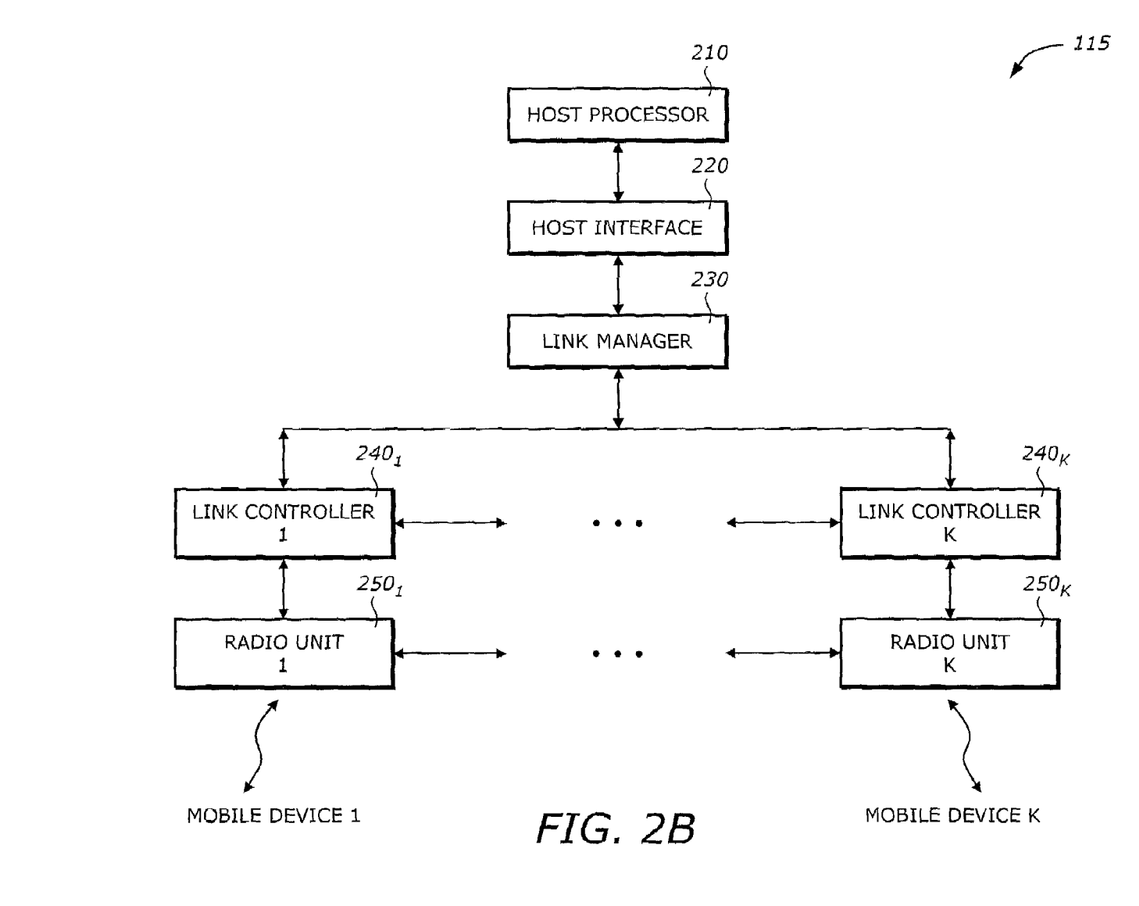
FIG. 2B is a diagram illustrating a multi-channel Bluetooth subsystem with a single link manager, multiple link controllers, and multiple radio units according to one embodiment of the invention.

FIG. 2B is a diagram illustrating a multi-channel Bluetooth subsystem 115 with a single link manager, multiple link controllers, and multiple radio units according to one embodiment of the invention.

In this embodiment, there is a single link manager 230 that manages the wireless connections. The single link manager 230 may perform the frequency management among the multiple radio units so that the generated signals are non-colliding. Alternatively, the single link manager 230 may delegate the task of frequency negotiation to the individual link controllers $240_1$ to $240_K$. The link controllers $240_1$ to $240_K$ and the radio units $250_1$ to $250_K$ may or may not be in the same circuit.

Figure 2C:
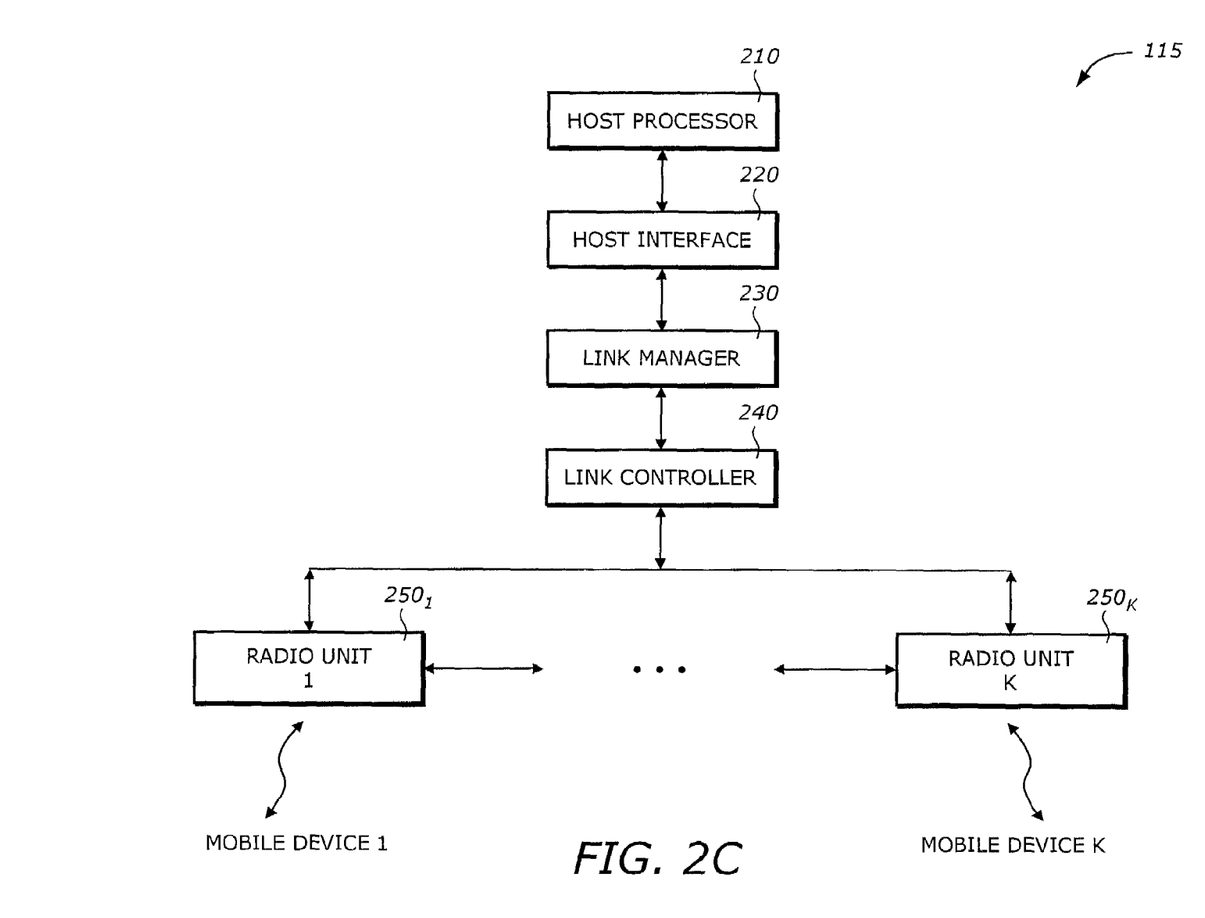
FIG. 2C is a diagram illustrating a multi-channel Bluetooth subsystem with a single link manager, a single link controller, and multiple radio units according to one embodiment of the invention.

FIG. 2C is a diagram illustrating a multi-channel Bluetooth subsystem 115 with a single link manager, a single link controller, and multiple radio units according to one embodiment of the invention.

In this embodiment, the link manager 230 and the link controller 240 perform essentially the same functions as previously described. The multiple radio units $250_1$ to $250_K$ process multiple RF signals at non-colliding frequencies.

Figure 2D:
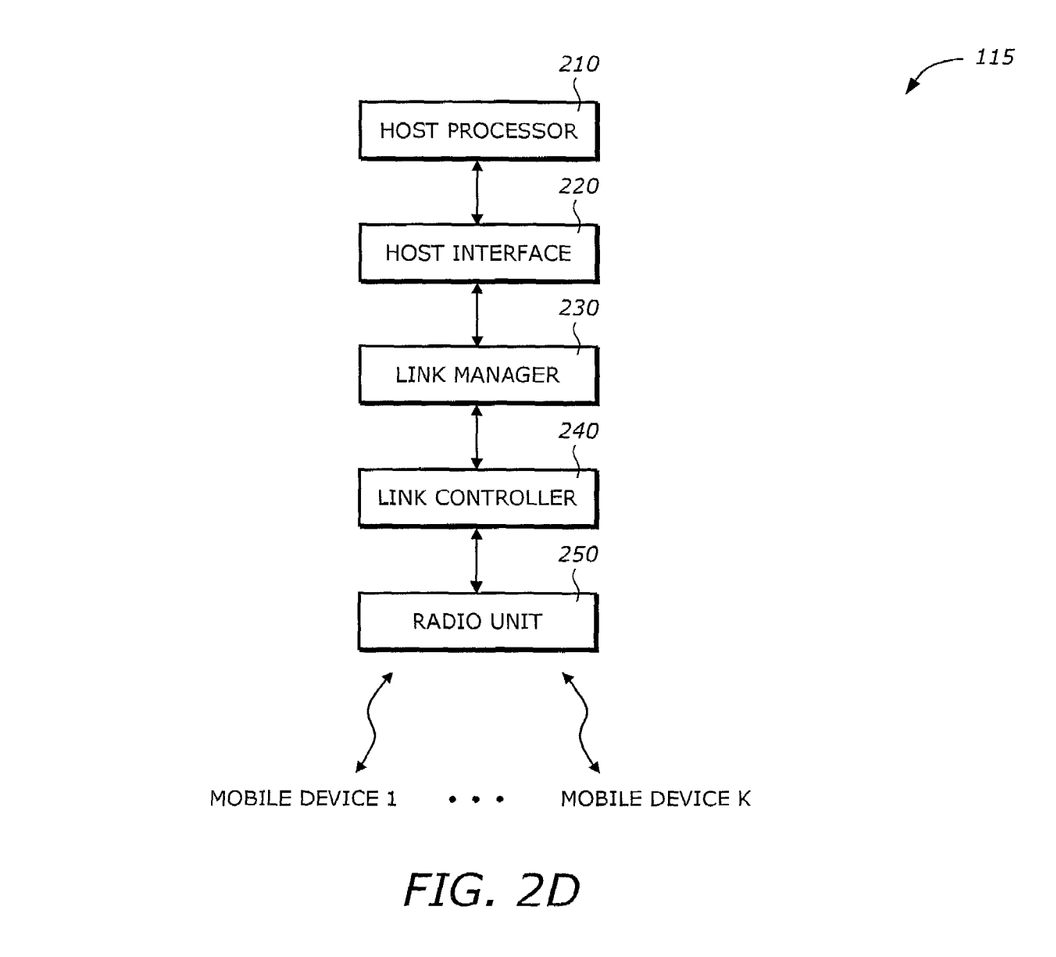
FIG. 2D is a diagram illustrating a multi-channel Bluetooth subsystem with a single link manager, a single link controller, and a single radio unit according to one embodiment of the invention.

FIG. 2D is a diagram illustrating a multi-channel Bluetooth subsystem 115 with a single link manager, a single link controller, and a single radio unit according to one embodiment of the invention.

In this embodiment, the link manager 230 and the link controller 240 perform essentially the same functions as previously described. The radio unit 250 can be used to receive and/or transmit multiple RF signals simultaneously within the reception and/or transmission period having non-colliding frequencies. If two signals have different spectra, the radio unit 250 may be programmed to have the frequency coverage wide enough to cover the spectrum of both signals. The antenna can be programmed accordingly. As an example, the radio unit 250 may process two signals each at 1 MHz bandwidth and are 2 MHz apart.

When two signals have different hopping frequencies, e.g., a first signal with a hopping frequency of 1,600 hops/s and a second signal with 1,200 hops/s, and orthogonal hopping sequences, the least common multiple of the hopping frequencies, e.g., 4,800 slots/s, can be used as the time slots by the link manager 230 or the link controller 240 or the radio unit 250 to decide which signal to transmit or receive in each time slot. In some time slots, no signal is transmitted or received. In some other time slots, one signal is transmitted or received. In some other time slots, two non-colliding signals may be transmitted or received.

Figure 3:
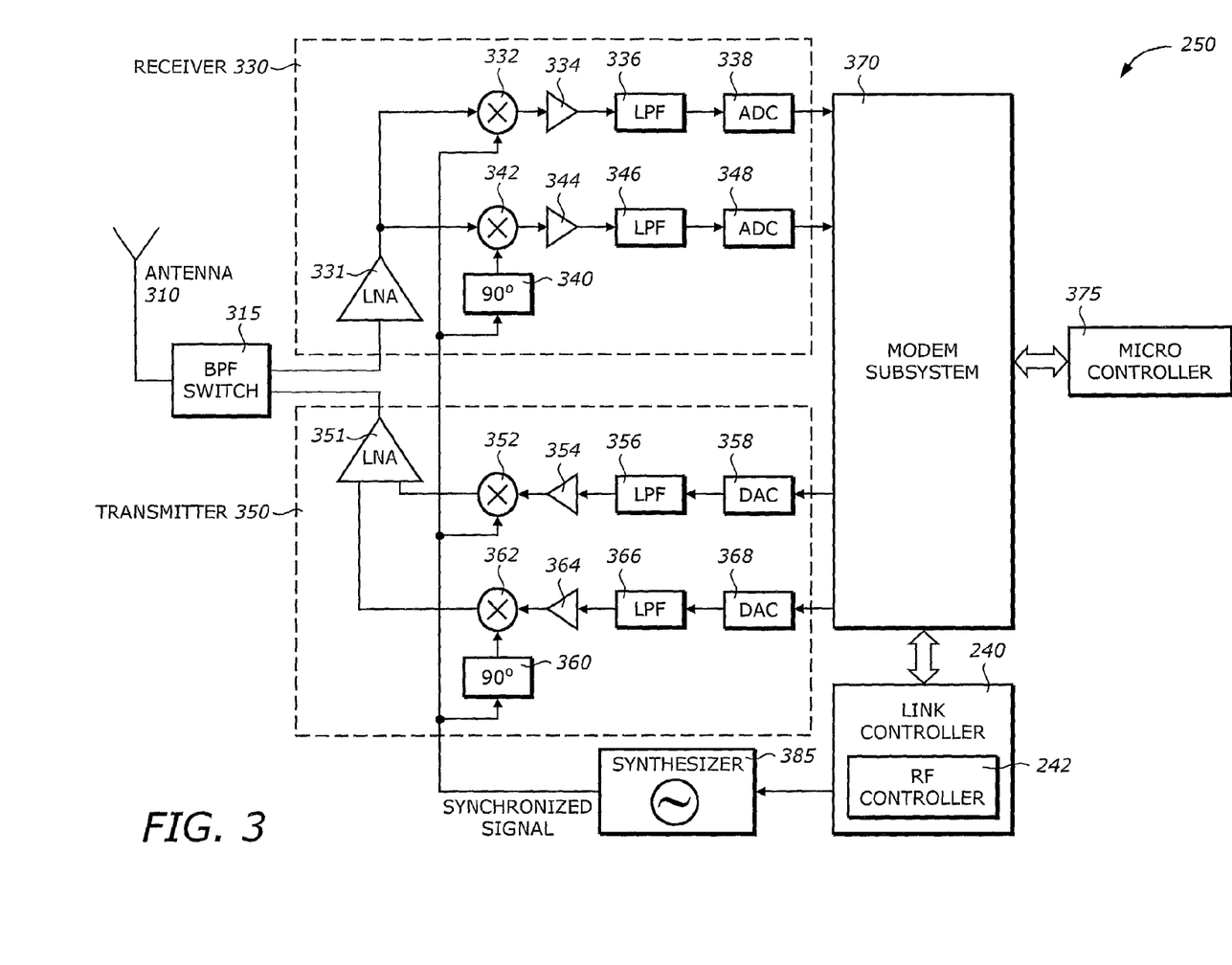
FIG. 3 is a diagram illustrating a radio unit according to one embodiment of the invention.

FIG. 3 is a diagram illustrating the radio unit 250 shown in FIGS. 2A–2D in which one embodiment of the invention can be practiced. The radio unit 250 includes an antenna 310, a band-pass filter (BPF) and radio frequency (RF) switch 315, a receiver 330, a transmitter 350, a modem subsystem 370, a micro-controller 375, and a synthesizer 385. The radio unit 250 is shown to interface with the link controller 240.

The antenna 310 receives and transmits RF signals within the allowable operating range. In one embodiment, the operating range is compatible with the Bluetooth system. The carrier frequency is 2400 MHz to 2483.5 MHz, designated as the industrial, scientific, and medical (ISM) band. Exceptions to the frequency range may exist in some countries such as 2471 MHz–2497 MHz (Japan), 2445 MHz to 2475 MHz (Spain), and 2446.5 MHz to 2483.5 MHz (France). There are on-going activities in these countries to modify their regulation for Bluetooth compatibility. The BPF and RF switch 315 filters out the spurious or noisy components and switches to connect between the receiver 330 and transmitter 350 as appropriate.

The receiver 330 receives the RF signal and generates in-phase and quadrature digital data to the modem subsystem 370. The receiver 330 includes a low noise amplifier (LNA) 331, mixers 332 and 342, a phase shifter 340, buffers and amplifiers 334 and 344, low pass filters (LPFs) 336 and 346, analog-to-digital converters (ADCs) 338 and 348. The LNA 331 amplifies the RF signal from the BPF and RF switch 315. The mixers 332 and 342 modulate the received signal with a synthesized signal generated from the synthesizer 385. The phase shifter 340 phase shifts the synthesized signal by approximately 90-degree. The mixer 332 generates the in-phase (I) signal by mixing the received signal with the synthesized signal. The mixer 342 generates the quadrature (Q) signal by mixing the received signal with the 90-degree phase shifted synthesized signal. The buffers and amplifiers 334 and 336 amplify the I and Q signals. The LPFs 336 and 346 filter the amplified I and Q signals, respectively. The ADCs 338 and 348 convert the analog I and Q signals into digital I and Q data, respectively, to send to the modem subsystem 370.

The transmitter 350 transmits RF signal to the BPF and RF switch 315. The transmitter 350 includes digital-to-analog converters (DACs) 358 and 368, LPFs 356 and 366, buffers and amplifiers 354 and 364, mixers 352 and 362, a phase shifter 360, and an LNA 351. The DACs 358 and 360 convert the digital data for the I and Q channels from the modem subsystem 370 into analog signals. The LPFs 356 and 366 filter the I and Q analog signals from the DACs 358 and 360, respectively. The buffers and amplifiers 354 and 364 amplify the respective filtered I and Q signals. The mixers 352 and 362 modulated the amplified I and Q signals to the corresponding frequency range. The phase shifter 360 phase shifts the synthesized signal by 90 degrees to mix with the Q signal. The LNA 351 amplifies and combines the I and Q signals into a composite RF analog signal to be sent to the BPF and RF switch 315.

The modem subsystem 370 demodulates the received signal and modulates the transmitted signal. The micro-controller 375 performs control and other user interface functions. The micro-controller 375 may be any appropriate processor that is used in mobile devices or computer systems such as personal digital assistants (PDA), palm computers, notebook computers, mobile telephones, etc. The micro-controller 375 may be optional, or may act as the link manager and/or the host processor 210 (FIGS. 2A–2D).

The link controller 240 provides interface between the modem subsystem 370 and the synthesizer 385. The link controller 240 includes an RF controller 242 to control the synthesizer 385 to generate appropriate frequency in a frequency hopping system. The synthesizer 385 is a digital frequency synthesizer that can generate signals at appropriate frequencies using a local oscillator. The synthesized signal from the synthesizer 385 is then used with the mixers 332, 342, 352, and 362 as described above.

In one embodiment, the generation of the synthesized signal with the synthesizer 385 is performed according to the Bluetooth requirements. For the Bluetooth RF subsystem, 5 types of hopping sequences are defined for the 79-hop system. A page sequence with 32 unique wake-up frequencies distributed equally over the 79 MHz, with a period length of 32. A page response sequence covering 32 unique response frequencies that all are in a one-to-one correspondence to the current page hopping sequence. The master and slave use different rules to obtain the same sequence. An inquiry sequence with 32 unique wake-up frequencies distributed equally over the 79 MHz, with a period length of 32. An inquiry response sequence covering 32 unique response frequencies the all is in a one-to-one correspondence to the current inquiry hopping sequence. A channel hopping sequence which has very long period length, which does not show repetitive patterns over a short time interval, but which distributes the hop frequencies equally over the 79 MHz during a short time interval.

The selection scheme consists of two parts: 1) selecting a sequence; 2) mapping this sequence on the hop frequencies. For the 79-hop system, the selection scheme chooses a segment of 32 hop frequencies spacing about 64 MHz and visits these hops once in a random order. Next a different 32-hop segment is chosen, etc. In case of the page, page scan, or page response substrates, the same 32-hop segment is used all the time (the segment is selected by the address; different units will have different paging segments). In Connection State, the output constitutes a pseudo-random sequence that slides through the 79 hops, depending on the selected hop system. Once the hopping frequency has been selected, the link controller 240 will tell the synthesizer 385 to which the local oscillator to generate the frequency that has been assigned.

Figure 4:
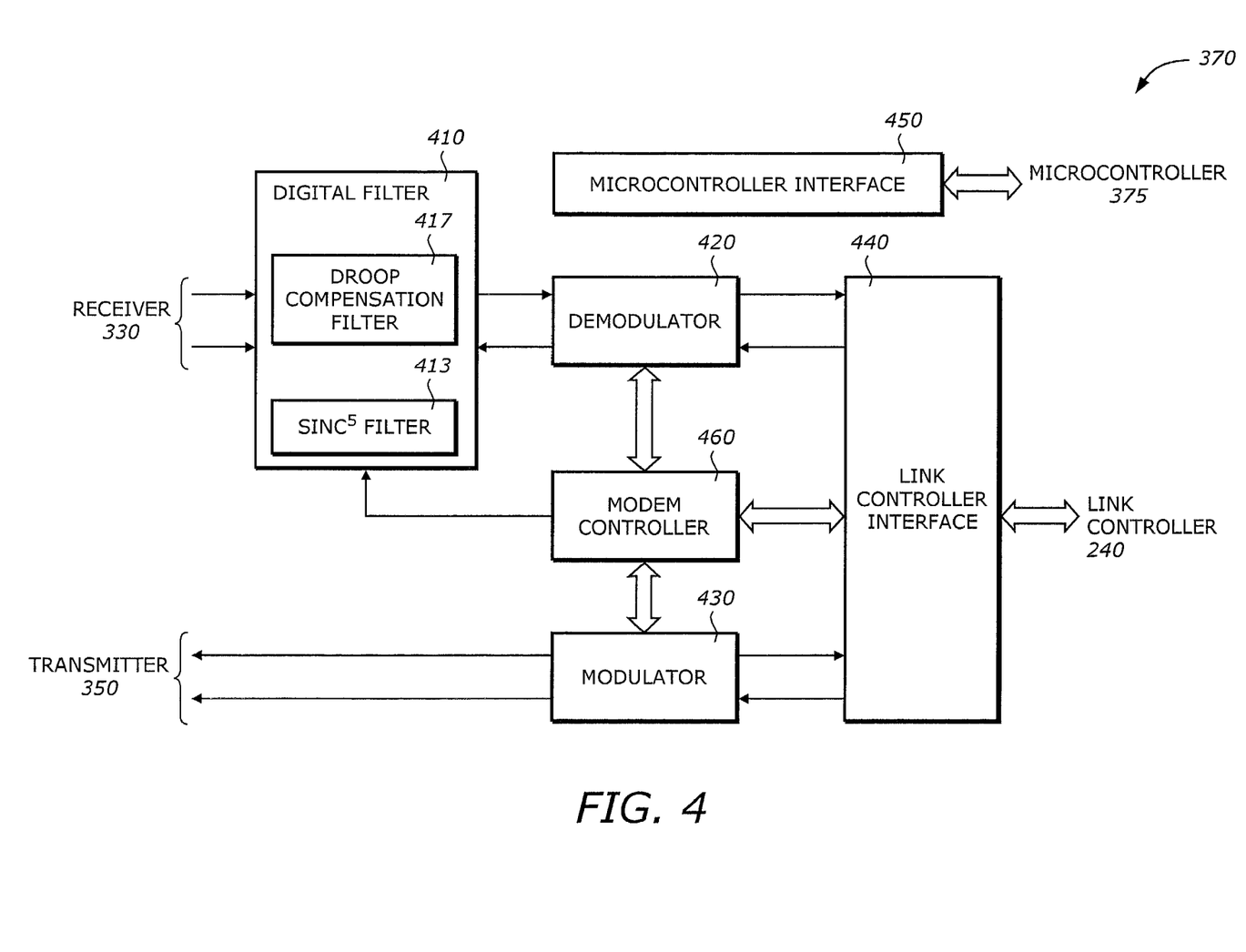
FIG. 4 is a diagram illustrating a modulator and demodulator subsystem according to one embodiment of the invention.

FIG. 4 is a diagram illustrating the modulator and demodulator (modem) subsystem 370 according to one embodiment of the invention. The modem subsystem 370 includes a digital filter 410, a demodulator 420, a modulator 430, a link controller interface 440, a micro-controller interface 450, and a modem controller 460.

The digital filter 410 is the digital portion of the ΣΔ ADCs 338 and 348 (FIG. 3). The digital filter 410 includes a Sinc(5) filter 413 and a droop compensation filter 417. The Sinc(5) low pass filter reduces the high frequency components generated by the ADCs 338 and 348 (FIG. 3). The droop compensation filter 417 compensates the gain in the passing band of the Sinc(5) filter.

The demodulator 420 is a circuit to detect the received digital data and sends the detected data to the link controller interface 440. The demodulator 420 includes circuitry to reduce inter-symbol interference, synchronize timing signals, and perform various modem control functions. The demodulator 420 uses the Gaussian Frequency Shift Keying (GFSK) modulation protocol.

The modulator 430 is a circuit to perform GFSK baseband modulation for multichannel systems. The conventional Bluetooth GFSK method can only process a single 1 MHz data channel. The modulator 430 provides GFSK modulation that can accommodate two 1 MHz data channels, or more. The modulator 430 receives the digital data to be transmitted from the link controller interface 440 and generates appropriate I and Q data to the transmitter 350 (FIG. 1).

The link controller interface 440 interfaces between the demodulator 420, the modulator 430, the modem controller 460 and the link controller 240 (FIG. 3). The micro-controller interface 450 provides an interface to the micro-controller 375. The micro-controller interface 450 may include circuitry to transfer information between the demodulator 420, modulator 430, and modem controller 460, and the micro-controller 375. The modem controller 460 generates control signals, timing signals, and enable signals to various components in the subsystem 370.

Figure 5:
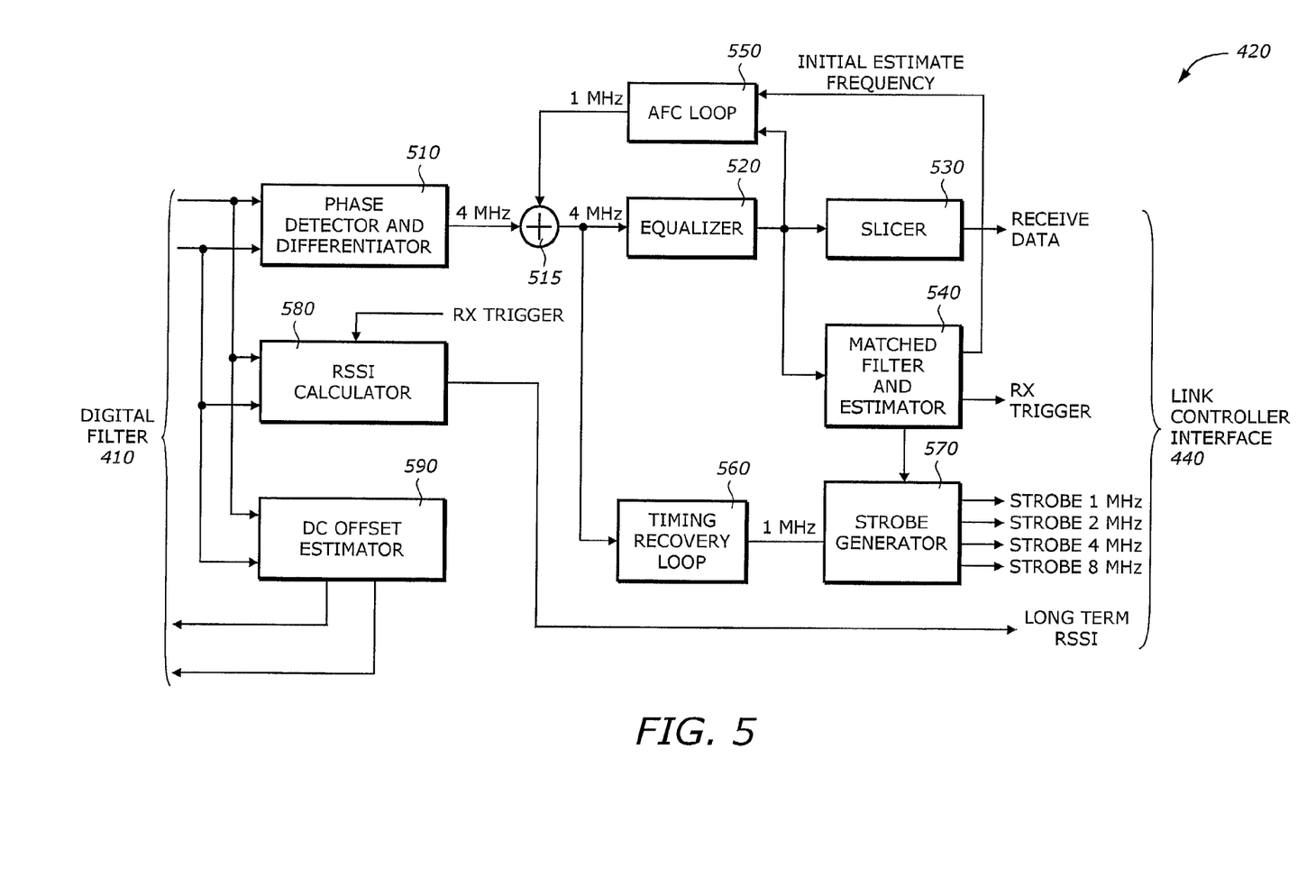
FIG. 5 is a diagram illustrating a demodulator according to one embodiment of the invention.

FIG. 5 is a diagram illustrating the demodulator 420 according to one embodiment of the invention. The demodulator 420 includes a phase detector and differentiator 510, a summer 515, an equalizer 520, a slicer 530, a matched filter and estimator 540, an automatic frequency control (AFC) loop 550, a timing recovery loop 560, a strobe generator 570, a receiver signal strength indicator (RSSI) calculator 580, and a direct current (DC) offset estimator 590.

The phase detector and differentiator 510 receives the I and Q data, computes the phase, and the phase difference. In one embodiment, the phase is computed by calculating $\tan^{-1}(Q/I)$. The phase difference is computed by taking the difference between successive phases as calculated above. The signal can be recovered using this phase/frequency information. The summer 515 adds the adjustment, compensation, or correction values from the AFC loop 550 to the output of the phase detector and differentiator 510. The equalizer 520 reduces the inter-symbol interference (ISI) and/or compensates for the channel distortion. In one embodiment, the equalizer 520 is implemented as a finite impulse response (FIR) filter. The AFC loop 550 receives the output from the equalizer 520 and generates adjustment or compensation values to compensate for any phase/frequency errors in the phase detector and differentiator 510.

The slicer 530 recovers the binary data from the detected frequency information provided by the equalizer 520. In one embodiment, the slicer 530 is a decision feedback detector. The output of the slicer 530 is the received data to be sent to the link controller interface 440. The matched filter and estimator 540 detects the signal and generates receiver trigger signal. In one embodiment, the matched filter and estimator 540 is a 64-tap FIR filter to detect the 64-bit pre-amble data used in the Bluetooth systems for the burst detection. The filter coefficients are the same as the pre-amble information with the same order. The matched filter and estimator 340 also provides the initial frequency estimate to the AFC loop 550.

The timing recovery loop 560 keeps track of timing information to maintain synchronous operation. This is necessary to keep the receiver timing on track and not drifting. The strobe generator 570 receives the timing information from the timing recovery loop 560 and provide appropriate clock signals at predetermined signal frequencies. In one embodiment, these frequencies include 1 Mz, 2 MHz, 4 MHz, and 8 MHz.

The RSSI calculator 580 calculates the RSSI and provide the long term RSSI to the link controller interface 440. This RSSI information is used by a remote system to adjust its transmitter power accordingly. The DC offset estimator 590 estimates the DC level at the receiver so that DC offset can be performed for improved performance.

In one embodiment, the modulator may accommodate two signals occupying 2 MHz frequency band. One of the baseband signals is shifted from 0 center frequency up to 2 MHz center frequency and then add with another baseband signal with 0 center frequency to obtain the new baseband signal which contain 2 MHz data with the spectrum has 2 MHz separation.

The 1 Mbps baseband binary data stream that is to be transmitted can be expressed as a(n), where a∈(0,1). The sequence a(n) is first converted to an antipodal sequence b(n), where b∈(−1,1), and to a stream of rectangular pulses r(t).

$$r(t) = \sum_n b(n) P(t - nT_b) \qquad (1)$$

where $P(t) = 1\ t \in (0, T_b)$ $P(t) = 0$ otherwise $T_b = 1/f_b$ is the symbol interval Next, r(t) is filtered by a Gaussian filter to provide g(t).

$$g(t) = r(t) * h(t) \qquad (2)$$

where $g(t)$=filtered pulse stream $h(t)$=impulse response of a Gaussian filter

Then, the carrier wave frequency is modulated by r(t) around a center frequency $f_c$. This implies modulating its phase $\phi$ by $\int g(t)$.

$$\Phi(t) = \omega_c \cdot t + 2\pi \cdot f_m \cdot \int_0^t g(\tau) d\tau \qquad (3)$$

where the phase has been normalized to 0 at t=0. The instantaneous frequency of the modulated signal will be:

$$f(t) = \frac{1}{2\pi} \cdot \frac{d\Phi}{dt} = f_c + f_m \cdot g(t) \qquad (4)$$

Where $f_c$=carrier frequency=$\omega_c/2\pi$ $f_m$=peak frequency deviation

The peak frequency deviation is determined by the bit rate. The Gaussian Minimum Shift Keying (GMSK) requires that one bit interval of duration $T_b$ contain N cycles of frequency $f_c-f_m$ and N+½ cycles of $f_c-f_m$. This lead to the relation $$f_m = \frac{1}{4T_b} = \frac{f_b}{4} = 0.25 f_b \qquad (5)$$

In the Bluetooth case, the modulator uses GFSK with the modulation index m from 0.28 to 0.35. For the case of m=0.32, we have:

$$f_m = \frac{0.32}{2T_b} = \frac{0.32 f_b}{2} = 0.16 f_b \qquad (6)$$

Next, the modulated carrier is generated. A voltage controlled oscillator (VCO) or equivalent digital synthesis method can produce directly $$y(t) = \cos(\Phi[t]). \qquad (7)$$

For high carrier frequencies, however, maintaining an adequate sampling rate with a digital approach requires an extremely high operating frequency, making this "direct synthesis" method impractical. An alternative is the Quadrature implementation. The desired signal y(t) can be written as $$\begin{aligned} y(t) &= \cos(\Phi[t]) = \cos\left[\omega_c \cdot t + 2\pi \cdot f_m \cdot \int_0^t g(\tau) d\tau\right] \\ &= \cos(\omega_c t) \cos\left[2\pi f_m \int_0^t g(\tau) d\tau\right] - \\ &\quad \sin(\omega_c t) \sin\left[2\pi f_m \int_0^t g(\tau) d\tau\right] \end{aligned} \qquad (8)$$

or, $$y(t) = I(t) \cdot \cos(\omega_c t) - Q(t) \cdot \sin(\omega_c t) \qquad (9)$$

I(t) and Q(t) can be written as $$I(t) = \mathrm{Re}\left\{\exp\left\{j 2\pi f_m \int_0^t g(\tau) d\tau\right\}\right\} = \mathrm{Re}\{u(t)\} \qquad (10)$$

$$Q(t) = \mathrm{Im}\{u(t)\}$$

where u(t) is a complex phase function,

The argument of I(t) and Q(t) signals varies much more slowly than $\Phi(t)$, making it feasible to generate I and Q digitally. After conversion to the analog domain, the final signal y(t) can be generated using a suitable mixer.

The above modulation procedure generates a waveform centered at $\omega_c$. To modulate the signal to a central frequency of $\omega_c + \omega_o$, a number of operations are performed as given in the following equation.

$$\Phi'(t) = \omega_c \cdot t + \omega_o \cdot t + 2\pi \cdot f_m \int_0^t g(\tau) d\tau \qquad (11)$$

The desired signal y'(t) can be written as $$y'(t) = \cos\left[\omega_c \cdot t + \omega_o \cdot t + 2\pi \cdot f_m \cdot \int_0^t g(\tau) d\tau\right] \qquad (12)$$

-continued $$= \cos(\omega_c \cdot t)\cos\left[\omega_o \cdot t + 2\pi f_m \int_0^t g(\tau)d\tau\right] -$$

$$\sin(\omega_c t)\sin\left[\omega_o \cdot t + 2\pi f_m \int_0^t g(\tau)d\tau\right]$$

Or, $$y(t)=I'(t)\cdot\cos(\omega_c t)-Q'(t)\cdot\sin(\omega_c t) \quad (13)$$

I'(t) and Q'(t) can be written as $$I'(t) = \text{Re}\left\{\exp\left[j\left(\omega_o \cdot t + 2\pi f_m \int_0^t g(\tau)d\tau\right)\right]\right\} = \text{Re}\{u'(t)\} \quad (14a)$$

$$Q'(t) = \text{Im}\{u'(t)\} \quad (14b)$$

where u'(t) is a complex phase function.

I'(t) and Q'(t) can be expressed in terms of I(t) and Q(t) as follows:

$$I'(t) = \quad (15a)$$
$$\cos\left[\omega_o \cdot t + 2\pi f_m \int_0^t g(\tau)d\tau\right] = \cos(\omega_o \cdot t) \cdot I(t) - \sin(\omega_o \cdot t) \cdot Q(t)$$

$$Q'(t) = \quad (15b)$$
$$\sin\left[\omega_o \cdot t + 2\pi f_m \int_0^t g(\tau)d\tau\right] = \sin(\omega_o \cdot t) \cdot I(t) + \cos(\omega_o \cdot t) \cdot Q(t)$$

For a given frequency interval $\omega_o$, equations (15a) and (15b) can be used to move the modulated signal from $\omega_c$ to $\omega_c+\omega_o$ where $\omega_o=2\pi f_o$.

As an example, let $f_o=2$ MHz=$2\times10^6$/s. In Bluetooth, the transmitter sample rates for the baseband signal I(t) and Q(t) is usually 8 MHz, so the sampling interval $\Delta t$ is $\Delta t=\frac{1}{8}$ MHz=$1/(8\times10^6)$s=$1.25\times10^{-7}$ s. For these values, $$\cos(\omega_o \cdot t)=\cos(2\pi f_o \cdot n \cdot \Delta t)=\cos(2\pi \cdot 2\times10^6/s \cdot n \cdot 1.25\times10^{-7}s)=\cos(n\pi/2) \quad (16a)$$

$$\sin(\omega_o \cdot t)=\sin(2\pi f_o \cdot n \cdot \Delta t)=\sin(2\pi \cdot 2\times10^6/s \cdot n \cdot 1.25\times10^{-7}s)=\sin(n\pi/2) \quad (16b)$$

where n=0, 1, 2, 3, 4 . . . are the 8 MHz sample points. The first several data for $\cos(\omega_o \cdot t)$ are: 1, 0, −1, 0, 1, 0, −1, 0, 1, 0, −1, 0 . . . The first several data for $\sin(\omega_o \cdot t)$ are 0, 1, 0, −1, 0, 1, 0, −1, 0, 1, 0, −1 . . . With this result, it is straightforward to express I'(t) and Q'(t) by I(t) and Q(t) without any calculation.

Figure 6:
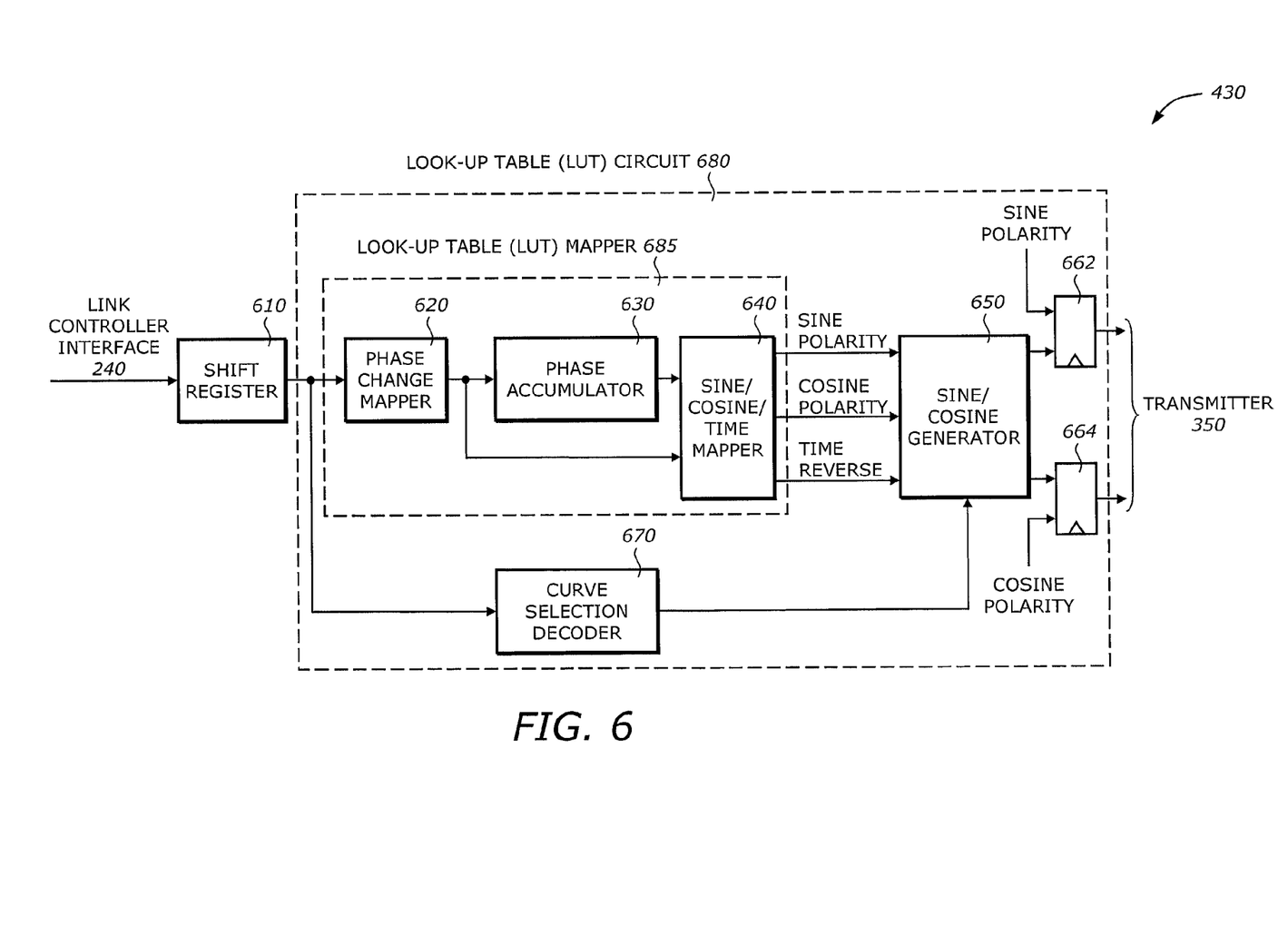
FIG. 6 is a diagram illustrating a modulator according to one embodiment of the invention.

FIG. 6 is a diagram illustrating the modulator 430 according to one embodiment of the invention. The modulator 430 includes a shift register 610, and a look-up table (LUT) circuit 680. The LUT circuit 680 includes a LUT mapper 685, a sine/cosine curve generator 650, a curve selection decoder 670, and sine and cosine registers 662 and 664. The LUT mapper 685 includes a phase change mapper 620, a phase accumulator 630, and a sine/cosine and time reversal mapper 640.

The shift register 610 serially shifts a first data stream representing the first signal at a predetermined rate. In one embodiment, the shift register 610 serially shifts three-bit data at 1 MHz rate. The output data will be processed at 8 MHz rate. The look-up table (LUT) circuit 680 generates a second data stream representing the second signal. The phase change mapper 620 reduces the look-up table (LUT) size by taking advantage of the symmetry property of the data. The phase accumulator 630 accumulates the phases from the eight different phase points. The sine/cosine and time reversal mapper 640 generates the mapping of the sign of the curves and the time direction of the mapping to save the size of the LUT in the sine and cosine generator 650. This information includes a sine polarity, a cosine polarity, and a time reversal indicator. The sine and cosine generator 650 contains the sine and cosine LUTs that store the sine and cosine curve data as shown in equations (15a), (15b), (16a) and (16b) above. The sine and cosine registers 662 and 664 store the data with the corresponding sine and cosine polarity information, and provide the stored data to the transmitter 360. The curve selection decoder 670 selects the curve data in the sine and cosine generator 650 that corresponds to the three-bit incoming data.

While this invention has been described with reference to illustrative embodiments, and using Bluetooth as an example, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
   a circuit to generate a first signal at a first frequency and a second signal at a second frequency, the first frequency being provided by a first frequency-hopping sequence such that the first and second frequencies are non-colliding, the circuit comprising:
   a shift register to serially shift a first data stream representing the first signal, and
   a look-up table (LUT) circuit coupled to the shift register to generate a second
   data stream representing the second signal; and
   a transmitter coupled to the circuit to transmit the first and second signals in a radio frequency (RF) band simultaneously within a transmission period.

2. The apparatus of claim 1 wherein the second frequency is provided by a second frequency-hopping sequence, the first and second frequency-hopping sequences being non-colliding.

3. The apparatus of claim 1 wherein the first and second frequencies are different by a fixed frequency interval.

4. The apparatus of claim 1 wherein the LUT circuit comprises:
   a mapper to generate mapping information;
   a curve selection decoder to generate curve selection; and
   a sine and cosine generator coupled to the mapper and the curve selection decoder to generate the second data stream based on the mapping information and the curve selection.

5. The apparatus of claim 1 wherein the RF band is one of a 2.4 GHz industrial scientific medicine (ISM) band and a bluetooth compatible frequency band.

6. A method comprising:
   generating a first signal at a first frequency and a second signal at a second frequency, the first frequency being provided by a first frequency-hopping sequence such that the first and second frequencies are non-colliding, comprising:
   serially shifting a first data stream representing the first signal, and
   generating a second data stream representing the second signal by a look-up table (LUT) circuit; and transmitting the first and second signals in a radio frequency (RF) band simultaneously within a transmission period.

7. The method of claim 6 wherein the second frequency is provided by a second frequency-hopping sequence, the first and second frequency-hopping sequences being non-colliding.

8. The method of claim 6 wherein the first and second frequencies are different by a fixed frequency interval.

9. The method of claim 6 wherein generating the second data stream comprises:
   generating mapping information;
   generating curve selection; and
   generating the second data stream from a sine and cosine generator based on the mapping information and the curve selection.

10. The method of claim 6 wherein the RF band is one of a 2.4 GHz industrial scientific medicine (ISM) band and a bluetooth compatible frequency band.

11. A system comprising:
   a link manager to manage wireless connections between at least a mobile device and a processing unit;
   a link controller coupled to the link manager to control the wireless connections; and
   a radio unit coupled to the link controller to process radio frequency (RF) signals for the wireless connections, the radio unit comprising:
     a circuit to generate a first signal at a first frequency and a second signal at a second frequency, the first frequency being provided by a first frequency-hopping sequence such that the first and second frequencies are non-colliding, the circuit comprising a shift register to serially shift a first data stream representing the first signal, and a look-up table (LUT) circuit coupled to the shift resister to generate a second data stream representing the second signal, and
     a transmitter coupled to the circuit to transmit the first and second signals in an
   RF band simultaneously within a transmission period.

12. The system of claim 11 wherein the second frequency is provided by a second frequency-hopping sequence, the first and second frequency-hopping sequences being non-colliding.

13. The system of claim 11 wherein the first and second frequencies are different by a fixed frequency interval.

14. The system of claim 11 wherein the RF band is one of a 2.4 GHz industrial scientific medicine (ISM) band and a bluetooth compatible frequency band.

* * * * *

UNITED STATES PATENT AND TRADEMARK OFFICE
CERTIFICATE OF CORRECTION

| | | |
|---|---|---|
| PATENT NO. | : 7,145,934 B2 | Page 1 of 1 |
| APPLICATION NO. | : 09/798482 | |
| DATED | : December 5, 2006 | |
| INVENTOR(S) | : Ping Liang | |

It is certified that error appears in the above-identified patent and that said Letters Patent is hereby corrected as shown below:

In the Issue Fee Transmittal form, the name of the Assignee was left blank. Item [73] the name of the Assignee should be OXFORD SEMICONDUCTOR, INC.

Signed and Sealed this

Twenty-sixth Day of December, 2006

JON W. DUDAS
*Director of the United States Patent and Trademark Office*